(12) United States Patent
Tutureski

(10) Patent No.: US 12,723,658 B2
(45) Date of Patent: Sep. 1, 2026

(54) VALVE CONTROL MECHANISM

(71) Applicant: Simon Tutureski, Lane Cove (AU)

(72) Inventor: Simon Tutureski, Lane Cove (AU)

( * ) Notice: Subject to any disclaimer, the term of this patent is extended or adjusted under 35 U.S.C. 154(b) by 0 days.

(21) Appl. No.: 19/129,920

(22) PCT Filed: Nov. 24, 2023

(86) PCT No.: PCT/AU2023/051204

§ 371 (c)(1),
(2) Date: May 14, 2025

(87) PCT Pub. No.: WO2024/112999

PCT Pub. Date: Jun. 6, 2024

(65) Prior Publication Data

US 2026/0185612 A1 Jul. 2, 2026

(30) Foreign Application Priority Data

Nov. 28, 2022 (AU) ................................ 2022903609

(51) Int. Cl.
*F16K 1/22* (2006.01)
*F16K 31/52* (2006.01)

(52) U.S. Cl.
CPC ............ *F16K 1/221* (2013.01); *F16K 31/521* (2013.01); *F16K 2200/304* (2021.08)

(58) Field of Classification Search
CPC ... F16K 1/221; F16K 31/521; F16K 2200/304
USPC .................................. 251/279–280, 305–308
See application file for complete search history.

(56) References Cited

U.S. PATENT DOCUMENTS 2,753,148 A * 7/1956 Oetiker .................... F02D 9/06 251/294
3,317,179 A 5/1967 Willis
4,205,820 A 6/1980 Bray
4,570,900 A * 2/1986 Lonardi ............... B65D 90/582 74/519
4,765,589 A * 8/1988 Sauze ..................... F16K 1/221 74/25
5,797,585 A * 8/1998 Auvity ............... B60H 1/00857 251/80

* cited by examiner

*Primary Examiner* — John Bastianelli
(74) *Attorney, Agent, or Firm* — INNOVATION CAPITAL LAW; Vic Lin

(57) ABSTRACT

A valve control mechanism having a butterfly valve with a pivoting disc controlled by a linkage system. The linkage involves a pivot arm connected to a frame, a control arm attached to the control rod, and a swing arm connecting the pivot and control arms. This arrangement allows the mechanism to alternate between open and closed configurations. In the open state, the pivot arm pivot point is at an open position, and the control arm rotates the control rod to open the valve. In the closed state, the pivot arm pivot point is at a closed position, and the control arm rotates the control rod to close the valve. Additionally, a control shaft and actuator extend and retract based on the linkage position, with the extended shaft preventing the pivot arm pivot point from moving to the open position.

7 Claims, 1 Drawing Sheet

Stopper
9A
12
11
10
1
9
2
3
4
5
6
7
8
6A
7A
8A
5A
13
close
open
close open

VALVE CONTROL MECHANISM

FIELD OF THE INVENTION

This invention relates to a valve control mechanism which may be used to control the control valves of the hydrostatic potential to kinetic energy conversion system described in PCT patent application PCT/AU2021/051315, the entire contents of which are herein incorporated by reference.

BACKGROUND OF THE INVENTION

PCT/AU2021/051315 (2022 May 12) by the present inventor Tutureski discloses a hydrostatic pressure to kinetic energy conversion system comprises a hydraulic head water column having a lower end which diverges to a pair of pressure channels.

A valve system interfaces the water column and the pressure channels so that hydrostatic pressure from the water column alternately pressurises each channel.

The system further comprises racks forced by pistons to act oppositely to rotate a driveshaft therebetween. Furling bladders within the channels forcibly unfurl under pressure to force the pistons.

According to FIG. 6, Tutureski teaches a hydraulic disc actuator comprising a hydraulically operated piston having a distal end which extends to entrap the disc in a closed position and retract to allow the disc to open.

When a head of the piston is pressurised underneath, the piston moves upward, thereby freeing the disc to move to the open position.

The present invention seeks to provide an alternative to this arrangement.

It is to be understood that, if any prior art information is referred to herein, such reference does not constitute an admission that the information forms part of the common general knowledge in the art, in Australia or any other country.

SUMMARY OF THE DISCLOSURE

There is provided herein a valve control mechanism comprising a pivot arm pivotally interfacing a frame, a swing arm pivotally interfacing the pivot arm and a control arm pivotally interfacing the swing arm.

The control arm controls operation of a disc of a butterfly valve between open and closed positions and the pivot and swing arms are configured to extend and retract to operate the disc between the closed and open positions respectively.

The mechanism further comprises an actuator configured to hold the pivot and swing arms extended at and under-centre position to keep the disc in the closed position and release the pivot and swing arms to retract to allow the disc to rotate to the open position. Furthermore, the disc is biased to the closed position.

The mechanism may be used to fully open and close valves at a fast rate, mainly for static pressure loads to release and stop the medium instantaneously such as for fire dampers whereby fast operation is required. The mechanism can be controlled through the operation of the actuator alone because the hydrostatic pressure opens the disc when the actuator is released and but closes again when the hydrostatic pressure drops whereby the pivot and control arms can be re-engaged by the actuator.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figures 1, 2:
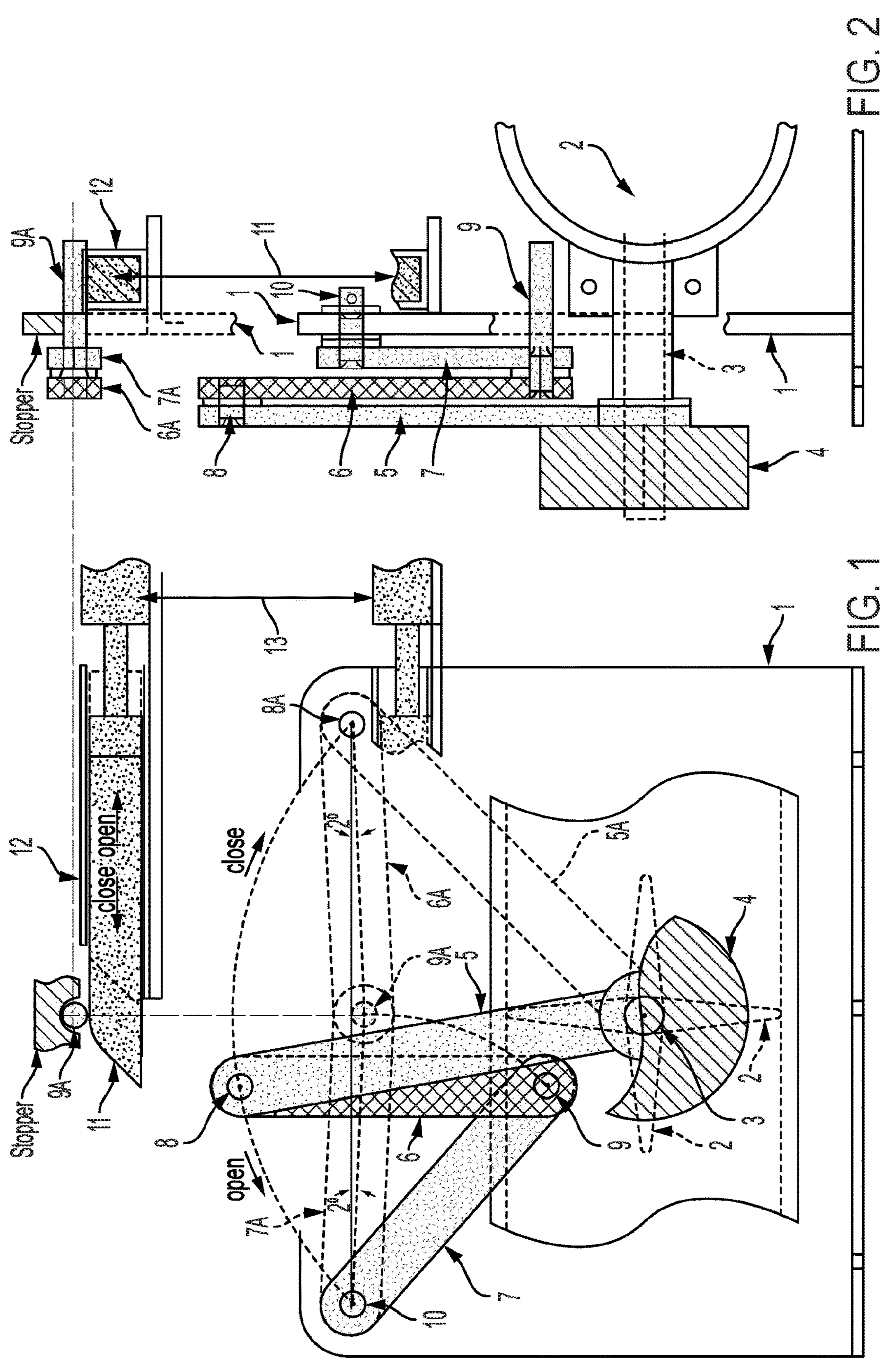
FIG. 1 shows a side view of a valve control mechanism.
FIG. 2 shows an end view of the valve control mechanism.

A valve control mechanism comprises a butterfly valve having a disc 2 pivoted by control rod 3 between open and closed positions. The butterfly valve may be the valve numbered 5 in the aforedescribed Tutureski PCT specification.

With reference to FIG. 2, the disc 2 may be circular and located within a conforming cylindrical conduit. In the closed position, the disc 2 is substantially orthogonal with respect to a longitudinal axis of the conduit, thereby preventing fluid flow therethrough. In the open position, the disc 2 is at an angle with respect to the longitudinal axis to allow fluid to flow through the conduit. In the open position, the disc 2 is preferably orthogonal with respect to the longitudinal axis to maximise fluid flow.

The mechanism further comprises a linkage interfacing the control rod 3 and a frame 1.

The linkage comprises a pivot arm 7 pivotally connected to the frame 1 at a frame pivot point 10. The linkage further comprises a control arm 5 controlling operation of a disc of a butterfly valve between open and closed positions. The control arm 5 may be fixed to the control rod 3.

The linkage further comprises a swing arm 6 connected to the pivot arm 7 at a pivot arm pivot point 9 and to the control arm 5 a control arm pivot point 8.

The linkage reciprocates between an open configuration to open the butterfly valve and a closed configuration to close the butterfly valve. In FIG. 1, the closed configuration is shown in dotted lines with corresponding reference numerals having the 'A' suffix. In other words, the pivot arm 7 and swing arm 6 are configured to extend and retract to operate the disc 2 between the closed and open positions respectively.

In the open configuration, the pivot arm pivot point 9 is at an open position, shown in solid lines in FIG. 1. Furthermore, in the open configuration, the control arm 5 has rotated the control rod 3 to position the disc 2 to open the butterfly valve.

However, in the closed configuration, the pivot arm pivot point 9 is located at a closed position 9A, shown in dotted lines in FIG. 1.

The pivot arm 7 and the swing arm 6 are configured to extend and retract to operate the disc 2 between the closed and open positions respectively. In other words, an upper angle between the pivot arm 7 and the swing arm 6 (given the orientation of FIG. 1) is greater when the linkage is in the closed configuration than when the linkage is in the open configuration.

The mechanism further comprises an actuator 11 which is configured to hold the pivot arm 7 and the swing arm 6 extended at and under-centre position to keep the disc 2 in the closed position. This under-centre position is illustrated by the dotted line configuration shown in FIG. 1 wherein there is a slight bend between the pivot arm 7 and the swing arm 7, such as at approximately 2° off an imaginary straight-line between the opposite distal ends of the pivot arm 7 and the swing arm 6 or the frame pivot point 10 and the control arm pivot point 8. The actuator 11 is further configured to release the pivot arm 7 and the swing arm 6 to collapse/retract to allow the disc 2 to rotate to the open position.

The actuator 11 may be slidably retained within housing 12 and an actuator mechanism 13 may be operably coupled thereto which extends the actuator 11 to an extended position when the linkage is in the closed configuration as shown in dotted lines in FIG. 1 and which retracts the actuator 11 to a retracted position when the linkage is in the open configuration, as shown in solid lines in FIG. 1.

When the actuator 11 is in the extended position, the actuator 11 prevents the pivot arm pivot point 9 from moving from the under-centre position (shown in dotted lines in FIG. 1) to the open position (shown in solid lines of FIG. 1). More specifically, as the linkage transitions to the closed configuration, the pivot arm pivot point 9 moves through an arc which intersects a longitudinal axis of the actuator 11. When the linkage is in the under-centre position, the pivot arm pivot point 9 has moved along the arc above the longitudinal axis of the actuator 11 (given the orientation shown in FIG. 1) whereafter the actuator 11 extends underneath the pivot arm pivot point 9 to thereby hold up the pivot arm pivot point 9 and prevent the pivot arm pivot point 9 dropping back down to the open position.

The arms 5, 6 and 7 may be relatively sized whereby the control arm 5 is longer than each of the pivot arm 7 and swing arm 6. The pivot arm 7 and the swing arm 6 may be approximately the same length.

According to this configuration, the pivot arm 7 pivots through an angle less than that through which the control arm 5 pivots when the linkage transitions from the closed to open configuration. According to the configuration shown in FIG. 1, the control arm 5 may pivot through approximately 90° whereas the pivot arm 7 may pivot through approximately 43°. A frame stopper may prevent overextension of the linkage beyond the under-centre position to an over-centre position. In other words, the frame stopper may limit the further upward pivoting of the pivot arm 7 beyond the under-centre position shown in dotted lines of FIG. 1.

The mechanism further comprises a biasing mechanism 4 which biases control rod 3 to return the disc 2 to the closed position. With reference to FIG. 2, the biasing mechanism 4 may comprise a cylindrical housing comprising a coil spring therein which biases on the control rod 3 to return the disc 2 to the closed position.

The mechanism may be used to fully open and close valves at a fast rate, mainly for static pressure loads to release and stop the medium instantaneously such as for fire dampers whereby fast operation is required.

The coil spring of the biasing mechanism 4 may be set at a tensile spring load to rotate the linkage to the close configuration and wherein the actuator 11 locks the linkage in the closed configuration to shut the valve 2. When the actuator 11 disengages from the pivot arm pivot point 9 under action of the actuator mechanism 13, the linkage folds to the open configuration and the valve 2 opens due to pressure acting on the valve overcoming the force applied by the biasing mechanism 4. Once the pressure is released, it no longer overcomes the force applied by the biasing mechanism 4 so that the linkage once again rotate to the closed configuration under the rotational force applied by the biasing mechanism 4.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The invention claimed is:

1. A valve control mechanism comprising:
a pivot arm pivotally interfacing a frame;
a swing arm pivotally interfacing the pivot arm;
a control arm pivotally interfacing the swing arm, the control arm controlling operation of a disc of a butterfly valve between open and closed positions;
an actuator, wherein:
the pivot and swing arms are configured to the extend and retract to operate the disc between the closed and open positions respectively;
the actuator is configured to;
hold the pivot and swing arms extended at an under-centre position to keep the disc in the closed position; and
release the pivot and swing arms to retract to allow the disc to rotate to the open position; and
wherein the disc is biased to the closed position.

2. The mechanism as claimed in claim 1, wherein the control arm is longer than each of the pivot and swing arms.

3. The mechanism as claimed in claim 1, wherein a distal end of the actuator has an angled face orientated to catch under the pivot and swing arms.

4. The mechanism as claimed in claim 1, wherein the disc is biased to the closed position by operation of a coil spring acting on a control rod connected to the disc.

5. The mechanism as claimed in claim 4, wherein a tensile spring load of the coil spring is adjustable.

6. The mechanism as claimed in claim 1, wherein in the under-centre position, the pivot and control arms are each held at approximately 2° from a straight line between distal ends thereof.

7. The mechanism as claimed in claim 1, further comprising a stopper which prevents the pivot arm and swing arm from going beyond the under-centre position to an over centre position.

* * * * *